United States Patent [19]

Negi et al.

[11] Patent Number: 5,068,077
[45] Date of Patent: Nov. 26, 1991

[54] PROCESS OF VACUUM-AIR PRESSURE DRAWING OF A LAMINATE CONTAINING AN EVOH/POLYAMIDE COPOLYMER

[75] Inventors: Taichi Negi; Satoshi Hirofuji, both of Kurashiki; Nobuo Tanaka, Nishinomiya; Syuji Kawai, Kurashiki, all of Japan

[73] Assignee: Kuraray Co., Ltd., Kurashiki, Japan

[21] Appl. No.: 630,386

[22] Filed: Dec. 18, 1990

Related U.S. Application Data

[63] Continuation of Ser. No. 239,056, Sep. 1, 1988, abandoned, which is a continuation of Ser. No. 30,039, Mar. 24, 1987, abandoned.

[30] Foreign Application Priority Data

Mar. 26, 1986 [JP] Japan .................... 61-69586

[51] Int. Cl.$^5$ .................. B29C 51/10; B29C 51/14
[52] U.S. Cl. ................... 264/512; 264/510; 264/514; 428/36.7; 428/516; 428/518; 428/520
[58] Field of Search ........... 264/510, 511, 512, 513, 264/515, 514; 428/516, 517, 518, 475.8, 476.1, 36.7, 36.6, 520

[56] References Cited

U.S. PATENT DOCUMENTS

| 4,261,473 | 4/1981 | Yamada et al. ............... 215/1 C |
| 4,347,332 | 8/1982 | Odorzynski et al. ........... 264/210.6 |
| 4,468,427 | 8/1984 | Degrassi et al. ............... 428/475.8 X |
| 4,500,677 | 2/1985 | Maruhashi et al. ............. 525/57 |
| 4,559,266 | 12/1985 | Misasa et al. ................. 428/341 |
| 4,568,580 | 2/1986 | Ghirardello et al. .......... 428/475.8 X |
| 4,576,988 | 3/1986 | Tanaka et al. ................. 524/503 |
| 4,608,286 | 8/1986 | Motoishi et al. ............... 428/35 |
| 4,613,644 | 9/1986 | Moritani et al. ............... 524/430 |
| 4,615,922 | 12/1986 | Newsome et al. ............. 428/475.8 X |
| 4,619,849 | 10/1986 | Anzawa et al. ................. 428/35 |
| 4,636,551 | 1/1987 | Okaya et al. ................... 525/60 |
| 4,640,870 | 2/1987 | Akazawa et al. ............... 428/483 |
| 4,645,695 | 2/1987 | Negi et al. ..................... 428/35 |
| 4,671,986 | 6/1987 | Clementini et al. ........... 428/216 |
| 4,704,314 | 11/1987 | Hsu et al. ....................... 428/475.8 X |
| 4,717,618 | 1/1988 | Tse et al. ....................... 428/475.8 X |
| 4,724,185 | 2/1988 | Shah ............................... 428/339 |
| 4,828,915 | 5/1989 | Schroeder et al. ............. 264/512 |

FOREIGN PATENT DOCUMENTS

| 0132565 | 2/1985 | European Pat. Off. . |
| 44-024277 | of 1969 | Japan . |
| 54-078749 | 6/1979 | Japan . |
| 58-036412 | 3/1983 | Japan . |
| 59-038897 | 9/1984 | Japan . |
| 60-161453 | 8/1985 | Japan . |
| 60-163952 | 8/1985 | Japan . |
| 62-138228 | 6/1987 | Japan ............................. 264/512 |

Primary Examiner—Jan H. Silbaugh
Assistant Examiner—Catherine Timm
Attorney, Agent, or Firm—Kramer, Brufsky & Cifelli

[57] ABSTRACT

A hot drawn multilayered structure including a layer of an ethylene-vinyl alcohol copolymer composition containing 70 to 95 wt % of EVOH having an ethylene content of 25 to 60 mol % and a saponification degree of at least 90%; and 5 to 30 wt % of an aliphatic copolymer polyamide containing capramide as a main structural unit, having a ratio of the number of methylene gorups to the number of amide groups satisfying the equation:

$$6.6 \leq CH_2/NHCO \leq 10$$

having a melting point of 110° to 180° C. and exhibiting a melt index of 0.1 to 10 g/10 mins.; having a thermoplastic resin layer on at least one surface of said layer. The multilayered structure has excellent gas barrier properties and minimized variability in gas barrier properties measured in different areas and minimal gel, hard spots, etc.

8 Claims, No Drawings

PROCESS OF VACUUM-AIR PRESSURE DRAWING OF A LAMINATE CONTAINING AN EVOH/POLYAMIDE COPOLYMER

This application is a continuation of application Ser. No. 07/239,056, filed Sept. 1, 1988, now abandoned which is a continuation of application Ser. No. 07/030,039 filed Mar. 24, 1987 now abandoned.

FIELD OF THE INVENTION

The present invention relates to a hot drawn, multilayered structure comprising a layer of a composition comprising an ethylene-vinyl alcohol copolymer (hereafter referred to as EVOH) and more particularly, to a multilayered structure hot drawn at a high speed which is free from pinholes, cracks, localized non-uniform sections, and also exhibits excellent gas barrier properties.

BACKGROUND OF THE INVENTION

Effectiveness of EVOH has been recognized in the field of wrapping films for foodstuffs, etc., especially for purposes of wrapping foodstuffs requiring barrier properties against oxygen, other products requiring retention of flavor, and the like. However, a film composed of EVOH alone is inadequate both in toughness and in barrier properties against water and moisture.

In order to attempt to overcome these inadequacies, EVOH has been used in the form of a multilayered structure obtained by laminating a thermoplastic resin such as polypropylene, polystyrene, etc. and various heat sealant layers represented by ionomers, ethylene-vinyl acetate copolymers, etc.

In the case where multilayered structures (films, sheets, parisons, etc.) prepared by various methods are subjected to fabrication into containers, etc., particularly in the case where drawing is performed at a temperature lower than the melting point of EVOH, small voids, cracks, localized non-uniform sections, etc. are often formed in the EVOH layer so that the oxygen barrier properties of a container so formed are seriously reduced. In addition, the container does not exhibit an esthetic appearance. Accordingly, under these circumstances, EVOH can not be used as containers for foodstuffs, etc.

In order to prevent pinholes, cracks, etc. in the EVOH layer, formed upon hot drawing, research has included incorporating various plasticizers into EVOH (Published Unexamined Japanese Patent Application Nos. 88067/78 and 20345/84), blending polyamide resins with EVOH (Published Unexamined Japanese Patent Application Nos. 141785/77 and 54755/83, 36412/83), etc. In any case, however, satisfactory results were not obtained. In order to improve the hot drawing properties of the EVOH using plasticizers represented by those containing hydroxy groups and the aromatic sulfonamide type, etc., it is necessary to incorporate 10 to 20 parts by weight of the plasticizers per 100 parts by weight of EVOH. In such case, many problems result, such as reduction in gas barrier properties, reduction in the adhesion strength of the EVOH layer to other resin layers perhaps due to bleeding of the plasticizers, etc. Therefore, such a system is inadequate.

Methods comprising blending polyamide resins with EVOH to impart flexibility thereto and improve fabrication properties are known. Many patent applications directed thereto have been filed (Published Examined Japanese Patent Application Nos. 24277/69 and 24813/85, Published Unexamined Japanese Patent Application No. 129035/83, Published Examined Japanese Patent Application No. 38897/84, Published Unexamined Japanese Patent Application No. 36412/83, etc.). However, use of polyamides, which may improve hot draw formability at a high speed, produce formed products in which a number of gel-like matters are present, perhaps due to a rapid chemical reaction with EVOH. Also, due to marked coloration, the polyamides have generally been found unsatisfactory for use.

Published Unexamined Japanese Patent Application Nos. 161453/85 and 163952/85 directed to the system of blending a polyamide resin having less gel and relatively less coloration and EVOH have also been published. Although it appears that hot drawing at a low speed would produce well formed products free from cracks, pinholes, non-uniform sections, etc., from their appearance, however, probably due to insufficient compatibility with EVOH, the system produces, as observed by measurement of the gas barrier properties, extremely variable data. It is suspected that the presence of minute pinholes that are hardly discernible by the naked eye are responsible. Furthermore, with the speed up of a hot drawing machine, the variation in the measurement data of gas barrier properties is greatly increased. The variation in data has resulted in reducing the reliability of these containers as ones with good gas barrier properties.

Therefore, an object of the present invention is to develop EVOH having good gas barrier properties and having good reliability as containers having such gas barrier properties, namely, to develop EVOH which does not form minute pinholes, cracks, non-uniform sections, etc. upon hot drawing at a high speed.

SUMMARY OF THE INVENTION

As described above, EVOH has various excellent properties but, when subjecting a laminate with a thermoplastic resin to fabrication into containers or the like, cracks, pinholes, localized non-uniform sections, etc. are formed in the EVOH layer which greatly reduces the gas barrier properties.

Thus, the present inventors have extensively investigated in order to develop an EVOH composition for use in multilayered containers having the high gas barrier properties possessed by EVOH without the formation of cracks, pinholes, localized non-uniform sections, etc. in the EVOH layer when the laminate is fabricated into containers, etc.

The present invention relates to a hot drawn multilayered structure, especially a multilayered structure hot drawn at a high speed, comprising a layer of a composition comprising 70 to 95 wt% of EVOH having an ethylene content of 25 to 60 mol% and a saponification degree of at least 90%; and 5 to 30 wt% of a polyamide, which is an aliphatic copolymer containing capramide as a main structural unit, having a ratio of the number of methylene groups to the number of amide groups satisfying the equation:

$$6.6 < CH_2/NHCO < 10$$

having a melting point of 110 to 180° C and exhibiting a melt index of 0.1 to 10 g/10 mins.; and having provided a thermoplastic resin layer onto at least one surface of said layer.

Various sheets having a thermoplastic resin layer(s) on one surface or both surfaces of the EVOH layer via an adhesive resin were prepared. Upon fabrication of the sheets into cups or bottles through reheating and stretching operations, it can be determined by the appearance of the containers and measurement of the gas barrier properties whether the fabrication property and the gas barrier properties are good or not. Therefore, the present inventors have blended various plasticizers, polymers, etc. with EVOH and measured the fabrication property and the gas barrier properties of the resultant EVOH. As a result, a good drawn product free from cracks, pinholes and localized non-uniform sections was thought to be obtained as follows: a polyamide resin having a melting point of 110 to 180° C and a melt index of 0.1 to 10 g/10 mins. is dry blended with EVOH, then fuse-blended through an extruder and pelletized, a sheet was prepared by laminating the thermoplastic resin layer(s) onto one surface or both surfaces via adhesive resin and the sheet was reheated and drawn. However, measurement of the gas barrier properties with respect to the drawn product revealed that the gas barrier properties were greatly varied depending upon the area measured; even worse, there is now a tendency to increase the formed product speed, i.e., drawing speed is greatly increased due to the recent development of the formed product technique, and when the aforementioned sheet is drawn at the higher speed, the gas barrier properties are reduced (mean values) and variation depending upon the area measured becomes greater, depending upon the drawing speed. Thus, the present inventors have made extensive investigations on the EVOH-polyamide blend and as a result, it has been surprisingly and unexpectedly found that a laminate obtained by laminating a thermoplastic resin layer onto a layer of an ethylene-vinyl alcohol copolymer composition obtained by blending 5 to 30 wt% of a polyamide, which is an aliphatic copolymer containing capramide as a main structural unit, having a ratio of the number of methylene groups to the number of amide groups satisfying the equation:

$$6.6 < CH_2/NHCO < 10$$

having a melting point of 110° to 180° C. and exhibiting a melt index of 0.1 to 10 g/10 mins. (melt index measured at 190° C. under a load of 2160 g in accordance with ASTM-D1238-65T) with EVOH produce containers having highly reliable gas barrier properties, which are not only free from reduced gas barrier properties (mean values) and minimize variation in the gas barrier properties depending upon the area measured, but also cause substantially no formation of gel or hard spots which tend to generate during operation over long periods of time. Published Unexamined Japanese Patent Application No. 78749/79 at page 6, Experiment No. 10, discloses a single layer film of EVOH having blended therewith an aliphatic copolymer polyamide exhibiting a $CH_2/NHCO$ ratio of 7.20 which exhibited resulted in breakage due to poor drawing property and drawing. However, nothing is disclosed on the findings that a thermoplastic resin laminated onto this blend layer and hot drawing the laminate, especially hot drawn at the laminate, especially hot drawn at a high speed, and further that by doing so, excellent effects as described above can be exhibited.

While it is not known why the EVOH-polyamide composition layer can greatly improve the formability and gas barrier properties when it is laminated onto the thermoplastic resin layer and the laminate is hot drawn, especially hot drawn at a high speed, and minute cracks occurring at the interface with the blend would be prevented to give a container having effective gas barrier properties and having high reliability.

DETAILED DESCRIPTION OF THE INVENTION

EVOH used in the present invention is a saponified ethylene-vinyl alcohol copolymer having an ethylene content of 25 to 60 mol%, preferably 25 to 55 mol%, in which the vinyl acetate component has a saponification degree of at least 90%, preferably 95% or more. When the ethylene content is less than 25 mol%, the formed product temperature approaches a decomposition temperature so that the formed product becomes difficult.

On the other hand, when the ethylene content exceeds 60 mol%, the gas barrier properties are reduced so that the gas barrier properties of the container having a multilayered structure are insufficient and such is not preferred. Furthermore, EVOH in which the saponification degree of vinyl acetate component is less than 95%, especially less than 90%, is not preferred because the gas barrier properties are insufficient, although such EVOH does produce a container with minimal, if any, cracks, pinholes, etc. upon hot drawing of the container. Furthermore, this EVOH has a melt index of 0.1 to 25 g/10 mins., preferably 0.3 to 20 g/mins. when measured at 190° C. under a load of 2160 g in accordance with ASTM-D1238-65T.

The polyamide used in the present invention is an aliphatic copolymer containing capramide as a main structural unit, and having a ratio of the number of methylene groups to the number of amide groups satisfying the equation: $6.6 < CH_2/NHCO <= 10$, preferably, $6.8 <= CH_2/NHCO <= 9.5$, more preferably, $7.0 < CH_2/NHCO < 9.5$, and most preferably, $7.3 < CH_2/NHCO <= 9.5$. As the other amide component which is copolymerizable with capramide, there are included laurin lactam (12-nylon), undecaneamide (11-nylon), hexamethylene sebacamide (6,10-nylon), hexamethylene adipamide (6,6-nylon), w-aminoheptanoic acid (7-nylon), w-aminononanoic acid (9-nylon), etc. Particularly effective are laurin lactam (12-nylon), hexamethylene adipamide (6,6-nylon) and w-aminononanoic acid (9-nylon). At least one among these other amide components may be used at the same time.

In the case where the ratio of the number of methylene groups to the number of amide groups, $CH_2/NHCO$, is less than 6.6, gel and hard spots tend to occur frequently, which results not only in bad appearance but also in breakage of the EVOH blend layer at areas where gel and hard spots have occurred, and upon high speed drawing the gas barrier properties are significantly reduced. On the other hand, in the case where the ratio of $CH_2/NHCO$ is greater than 10, the gel and hard spots rarely occur and a container formed by high speed drawing is apparently good. However, areas having poor transparency are present, the gas barrier properties are poor and variability becomes greatly increased. This is assumed to probably be due to frequent occurrence of minute pinholes.

It has now been noted that even in polyamides satisfying $6.6 <= CH_2/NHCO <= 10$, fabrication properties are not necessarily improved depending upon brand of nylon. As a result of extensive investigations, it has been found that good containers of a multilayered structure having good appearance, good gas barrier properties and minimized variability in the gas barrier properties can be obtained by high speed hot drawing, when the polyamides employed have a melting point (temperature of the major endothermic peak by DSC (scanning speed, 10° C./min.) of 110° to 180° C. and a melt index of 0.1 to 10 g/10 mins., preferably 0.5 to 9 g/10 mins.

The amount of the polyamide based on EVOH is 5 to 30 wt%, preferably 7 to 25 wt%. When the amount is less than 5 wt%, fabrication properties are not satisfactorily improved and cracks and variability tend to occur. On the other hand, when the amount exceeds 30 wt%, the gas barrier properties are greatly reduced so that containers prepared therefrom are not usable as gas barrier ones.

The method of blending EVOH with the polyamide is not particularly limited. There is a method which comprises dry-blending EVOH with the polyamide, pelletizing the blend using a Banbury mixer, a single-or twin-screw extruder, etc. and then drying the pellets, or the like. When the blend is heterogeneous or gel and hard spots occur or contaminate during the blending operation, it is highly likely that breakage of the EVOH blend layer and variability might occur often upon hot drawing. Therefore, it is preferred that an extruder having a high kneading degree is used, the opening of a hopper sealed with $N_2$ and the extrusion performed at low temperatures, upon blending with heating using an extruder. Furthermore, when the diameter of the nylon particles is measured after the blended pellets are formed into a sheet of 50μ using a hot press at 220° C, it is preferred that particles having a particle diameter of 0.1 μ or less are present in an amount of at least 50%, preferably L those having a diameter of 0.05 μ or less in an amount of at least 50%.

Additionally, other additives (various resins, antioxidants, plasticizers, coloring agents, etc.) can be freely used within a range which does not inhibit the effect and function of the present invention, upon mixing them. For purposes of stabilizing resins against heat and preventing the occurrence of gel, it is particularly advantageous to incorporate 0.01 to 1 wt% of a hydrotalcite type compound, hindered phenol type or hindered amine type stabilizer.

The thermoplastic resin used in the present invention may be any resin that can be drawn and formed at temperatures described below. Preferred examples of such resin include polypropylen resin, polystyrene resin, polyamide resin, polyvinyl chloride resin, and saturated polyester resin (polyethylene terephthalate resin, etc.). Among them, polypropylene resin and polystyrene resin are most preferred.

When the melting point of EVOH and the temperature of the thermoplastic resin upon hot drawing are designated X° C. and Y° C., respectively, the following equation can be satisifed:

$$X-10° C. > Y > X-110° C.$$

When Y is higher than (X−10)° C., the EVOH is softened and melts upon hot drawing so that the formed product can generally be effected even though no additive is incorporated. On the other hand, when Y is lower than (X−100)° C., the glass transition temperature (Tg) of the thermoplastic resin becomes lower than room temperature so that the formed product exhibits a seriously unstable shape at room temperature with great dimensional change and therefore, such is not usable.

To obtain the multilayered structure, there are many applicable methods including a method which comprises laminating the EVOH composition on the thermoplastic resin by an extrusion laminate method, a dry laminate method, a co-extrusion laminate method, a co-extrusion sheet preparation method (feed block or multi-manifold method, etc.), a co-extrusion pipe preparation method, a co-injection method, various solution coating methods, etc. to give a laminate, then reheating and drawing the laminate within a temperature range lower than the melting point of EVOH using, for example, a deep draw vacuum air-pressure forming machine, a biaxially drawing blower, etc.; or a method which comprises subjecting the aforesaid laminate (sheet or film) to a biaxially drawing machine and hot drawing; or a method which comprises biaxially drawing the EVOH composition and the thermoplastic resin and drawing while co-injecting them, etc.

Further, there is no particular limitation to the thickness of the multilayered structure; taking formability, costs, etc. into account. However, it is preferred that the ratio of the thickness of the EVOH layer to the whole thickness be approximately 2 to about 20%. The construction of the multilayered structure can include as representative examples: the thermoplastic resin layer/EVOH composition layer/thermoplastic resin layer, the EVOH composition layer/adhesive resin layer/thermoplastic resin layer and the thermoplastic resin layer/adhesive resin layer/EVOH composition layer/adhesive resin layer/thermoplastic resin layer. In addition, a recovered product of the multilayered structure according to the present invention may also be incorporated in each of these layers. Alternatively, a recovering layer may be separately provided. In the case where the thermoplastic resin layers are provided on both outer layers, the resins may be the same or different. The adhesive resin as used herein refers to any resin which is capable of drawing, is formable at temperatures lower than the melting point of EVOH and can adhere the EVOH composition layer with the thermoplastic resin layer. Preferred adhesive resins include polyolefines (e.g., polyethylene, polypropylene), ethylene-vinyl acetate copolymers, ethylene-acrylic acid ester (e.g., methyl ester, ethyl ester) copolymers, etc., having added or grafted thereto ethylenically unsaturated carboxylic acids or anhydrides thereof (e.g., maleic anhydride).

In the present invention, the hot drawn multilayered structure includes containers such as cups, bottles, etc., or sheets or films obtained by hot drawing, as described above. Furthermore, hot or heating refers to any method for allowing the multilayered structure to stand at temperatures necessary for hot drawing for a definite period of time and operating the multilayered structure so as to be substantially thermally uniform; taking operability into account. A preferred method for heating and making thermally uniform employs various heaters.

The hot or heating operation may be performed at the same time as the drawing or prior to the drawing. The term drawing refers to the operation of forming the uniformly heated multilayered structure into a container, a cup, a sheet or a film by a chuck, a plug, vacuum air-pressure, blowing, etc. Monoaxial drawing and biaxial drawing (simultaneous or sequential) can be used. A drawing magnification and a drawing speed can be appropriately chosen depending upon the purpose, but in the present invention, high speed drawing means a method for uniformly forming a container or a film at a drawing speed (a drawing area magnification (%)/min.) as high as $5 \times 10^5$ %/min. or more, but it is not always necessary that the formed product be oriented.

In the present invention, the moisture content of the EVOH composition layer which is a constituent of the multilayered structure is not particularly critical during the hot drawing but is is preferred that the moisture content be in a range of 0.01 to 10%, most preferably 0.01 to 5%.

The thus obtained hot drawn multilayered structure of the present invention is free from pinholes, cracks and localized non-uniform sections in the EVOH composition layer such that the gas barrier properties are extremely good and, the multilayered structure is effective for producing extremely good containers almost free from variability in the gas barrier properties for wrapping foodstuffs or as containers for which retention of flavor is required.

Hereinafter, the present invention will be described in more detail with reference to the examples but the present invention is not deemed to be limited thereby.

EXAMPLE 1

EVOH (manufactured by Kuraray Co., Ltd., EVAL-EP-F101) having an ethylene content of 31 mol%, a saponification degree of 99.4% and a melt index (MI) of 1.3 g/10 mins. was formulated with 15% of 12,6-nylon (melting point (mp) 155° C., MI=4.0, $CH_2/NHCO$=7.4) containing a capramide unit in an amount of 49 wt%. The mixture was subjected to extrusion pelletization at 200° C. in a $N_2$ flow using a twin-screw o type vented 40 $\phi$ extruder. The obtained pellets were dried at 80° C. for 8 hours. The pellets were subjected to a feed block type co-extrusion apparatus for forming 3 kinds/5 layers to produce a sheet. The sheet was composed of both outermost polypropylene (manufactured by Mitsubishi Chemical Industry Co., Ltd., Noblen MA-6) layers of 800 $\mu$ each, adhesive resin layers (manufactured by Mitsubishi Petrochemical Co., Ltd., Modec P-300F, maleic anhydride-modified polypropylene) of 50 $\mu$ each and as the innermost layer (center), the aforesaid EVOH composition layer of 50 u. The thus obtained sheet was subjected to a vacuum air-pressure forming machine (drawing speed at $9 \times 10^5$ %/min. followed by hot forming (SPPF forming) at 155° C. The thus formed product had a good transparent appearance and formed neither crack nor localized non-uniform sections. The gas barrier properties of this container were measured at 20° C. and 65% RH (manufactured by Mocon Co., Ltd., 10/50 Model); the container exhibited extremely good gas barrier properties of 0.5 cc.20 $\mu/m^2$.24 hr.atm and also the variability [R(cc.20 $\mu/m^2$.24 hr.atm)=the maximum value - the minimum value]in measurement data when measured with 20 samples was as low as 0.1 cc.20 $\mu/m^2$.24 hr.atm.

EXAMPLE 2

A sheet was prepared in a manner similar to Example 1 except that both outermost layers were changed from polypropylene to polystyrene (manufactured by Idemitsu Petrochemical Co., Ltd., Styrol ET-61) and the adhesive resin layers were changed from Modec P-300F to Mersen M-5420 (manufactured by Toyo Soda Co., Ltd., maleic anhydride-modified ethylene-vinyl acetate copolymer). The sheet was subjected to vacuum air-pressure forming (drawing speed at $9 \times 10^5$ %/min.) at 130° C. The formed product obtained had a good appearance and was free from cracks and localized non-uniform sections. The gas barrier properties of this container were 0.6 cc.20 $\mu/m^2$.24 hr.atm (20° C., 65% RH) and, the variability (R) in the barrier properties of 10 samples was as low as 0.2 cc.20 $\mu/m^2$.24 hr.atm, indicating that the container was a good gas barrier one.

COMPARATIVE EXAMPLE 1

A sheet was prepared in a manner similar to Example 2 except that the blending rate of polyamide was changed from 15 wt% to 4 wt%. The thus obtained container had many cracks and localized non-uniform sections in many places. Furthermore, the gas barrier properties were as high as 5 cc.20 $\mu/m^2$.24 hr.atm and the container could not withstand use.

COMPARATIVE EXAMPLE 2

A sheet was prepared in a manner similar to Example 2 except that the polyamide was changed to 6,12-nylon (mp=180° C., MI=4, $CH_2/NHCO$=10.5) containing 5 wt% of capramide. The formed product obtained had an extremely good appearance and was substantially free from cracks, hard spots and localized non-uniform sections. When the gas barrier properties were measured with regard to 20 samples, they not only exhibited average results as high as 1.2 cc.20 $\mu/m^2$.24 hr.atm, but also variability (R) as high as 5.3 cc.20 $\mu/m^2$.24 hr.atm. The container thus produced is reliable as a gas barrier container.

COMPARATIVE EXAMPLE 3

Forming was performed in a manner similar to Comparative Example 2 except that the forming speed of the vacuum air-pressure forming machine was greatly reduced and the drawing speed was set at $10^5$%/min. The appearance (hard spots, cracks and localized non- o uniform sections) of the formed product tended to be somewhat improved as compared to Comparative Example 2 and the gas barrier properties (average) were 0.7 cc.20 $\mu/m^2$.24 hr.atm, exhibiting some improvement. Furthermore, variability in the measurement data tended to be reduced to 0.9 cc.20 $\mu/m^2$.24 hr.atm. From such facts, it is noted that formability and gas barrier properties (variability) greatly depend upon the forming speed (drawing rate). It is also apparent from this comparative example that the stability and reliability of the quality of the formed product with an increased forming speed have become very important and are greatly desired.

COMPARATIVE EXAMPLE 4

Forming was performed in a manner similar to Example 2 except that the polyamide was changed to 6-polyether nylon elastomer (polyoxytetramethylene copolymer, mp=190° C., MI=2, $CH_2/NHCO$=8.3) containing 61 wt% of capramide. Localized non-uniform sections and cracks were noted in the formed product obtained by deep drawing. When the gas barrier properties were measured with regard to 20 samples, they exhibited a tolerable average level of 1.0 cc.20 $\mu/m^2$.24 hr.atm, but the variability (R) was as high as 4.5 cc.20 $\mu/m^2$.24 hr.atm, which raised a problem as to reliability as a gas barrier container so that the container was not usable.

EXAMPLE 3

Forming was carried out in a manner similar to Example 2 except that the EVOH was changed to one having an ethylene content of 44 mol%, a saponification degree of 99.5% and a melt index (190° C) of 5.4 g/10 mins. (manufactured by Kuraray Co., Ltd., EVAL.EP-E105). The formed product obtained had a good appearance and was free from cracks and localized non-uniform sections. The gas barrier properties were 1.7 cc.20 μ/m².24 hr.atm (20° C., 65% RH) and, the variability (R) in the gas barrier properties of 20 samples was as low as 0.2 cc.20 μ/m².24 hr.atm, indicating that the container was a good gas barrier container.

EXAMPLE 4

Forming was performed in a manner similar to Example 1 except that the nylon formulated with the EVOH was changed to 12-nylon (mp=178° C., MI=4.0, $CH_2/NHCO=8.8$) containing 25 wt% of the capramide unit. As a result, the formed product obtained had a good appearance and was free from cracks and localized non-uniform sections. The gas barrier properties of this container were measured at 20° C. and 65% RH and were as good as 0.7 cc.20 μ/m².24 hr.atm. Furthermore, the variability [R (cc.20 μ/m².24 hr.atm) =the maximum value−the minimum value,) of the gas barrier properties of 20 samples, was as low as 0.2 cc.20 μ/m².24 hr.atm, indicating that it was a good gas barrier container.

EXAMPLE 5

Forming was performed in a manner similar to Example 2 except that the nylon formulated with the EVOH was changed to 6,9-nylon (mp =165° C., MI=6.0, $CH_2/NHCO=6.7$) containing 35 wt% of the capramide unit. As a result, the formed product obtained had a good appearance and was free from cracks and localized non-uniform sections. The gas barrier properties of this container were 0.5 cc.20μ/m².24 hr.atm (20° C. and 65% RH). Furthermore, the variability (R) of the gas barrier properties measured with 20 samples was as low as 0.1 cc.20 μ/m².24 hr.atm, indicating that it was a good gas barrier container.

COMPARATIVE EXAMPLE 5

Forming was performed in a manner similar to Example 2 except that the nylon formulated with the EVOH was changed to 6,9-nylon (mp =195° C., MI=6.0, $CH_2/NHCO=5.5$) containing 80 wt% of the capramide unit. As a result, a number of hard spots were noted on the sheet base upon forming sheets. When this sheet was subjected to heat forming, large cracks were noted around the hard spots. This container was inadequate, in its appearance and also the gas barrier properties of the container were as high as 1.2 cc.20 μ/m².24 hr.atm. Furthermore, the variability (R) in the gas barrier properties measured with 20 samples was as high as 1.8 cc.20 μ/m².24 hr.atm, indicating that the container could not withstand use.

EXAMPLE 6

Using a co-injectable, hot drawn blow molding machine manufactured by Nissei ASB Co., Ltd., the EVOH-nylon blended pellets used in Example 1 were formed into a container of 2 kinds/3 layers or 2 kinds/5 layers composed of polyester ([η]=0.70 dl/g)/EVOH blend product/polyester ([η]=0.70 dl/g). The container so produced exhibits good gas barrier properties (0.05 cc.20 μ/m².24 hr.atm; R=0.01 cc.20 μ/m².24 hr.atm) in which no abnormality such as scoreline-like uneven thickness, localized non-uniform sections, cracks, gels, etc. were observed.

COMPARATIVE EXAMPLE 6

The EVOH of Example 6 without the nylon was treated as set forth in Example 6. As a result, scoreline-like unevenness in thickness and localized non-uniform sections were frequently observed in the bottle formed, which could not withstand use.

While the invention has been described in detail and with reference to specific embodiments thereof, it will be apparent to one skilled in the art that various changes and modifications can be made therein without departing from the spirit and scope thereof.

What is claimed is:

1. A method of preparing a container comprising the step of forming said container by vacuum air-pressure at a drawing speed of at least $5 \times 10^5$%/min from a multi-layered laminate comprising a layer of an ethylene-vinyl alcohol copolymer composition comprising 70 to 95 wt% of an ethylene-vinyl alcohol copolymer having an ethylene content of 25 to 60 mol% and a saponification degree of at least 90%; 5 to 30 wt% of an aliphatic copolymer polyamide containing capramide as a main structural unit, said copolymer polyamide having a ratio of the number of methylene to the number of amide groups satisfying the condition:

$$7.0 \leqq CH_2/NHCO \leqq 10.0$$

having a melting point of 110° to 180° C. and exhibiting a melt index of 0.1 to 10 g/10 mins.; and having a thermoplastic resin layer on at least one surface of said layer, said thermoplastic resin layer drawable in a hot drawing temperature range satisfying the equation:

$$X - 10° C. \geqq Y \geqq X - 110° C.$$

wherein X represents the melting pint (°C.) of EVOH and Y represents the hot drawing temperature.

2. A method of preparing a container according to claim 1 wherein said thermoplastic resin is selected from the group consisting of polypropylene, polystyrene, polyvinyl chloride and polyamide.

3. A method according to claim 1 wherein said thermoplastic resin is a polystyrene resin.

4. A method according to claim 1 wherein said thermoplastic resin is a polypropylene resin.

5. A method according to claim 1 wherein said ratio of the number of methylene groups to the number of amide groups satisfies the equation $7.0 \leqq CH_2/NHCO \leqq 9.5$.

6. A method according to claim 1 wherein said melting point of the aliphatic copolymer polyamide is 120° to 170° C.

7. A method according to claim 1 wherein said melt index of the aliphatic copolymer polyamide is 0.5 to 9 g/10 mins.

8. A method according to claim 1 wherein said layer of the composition comprising the aliphatic copolymer polyamide and the ethylene-vinyl alcohol copolymer is made an intermediate layer and said thermoplastic resin layers are provided on both surfaces of said layer.

* * * * *

UNITED STATES PATENT AND TRADEMARK OFFICE
CERTIFICATE OF CORRECTION

PATENT NO. : 5,068,077
DATED : November 26, 1991
INVENTOR(S) : Taichi Negi et al.

It is certified that error appears in the above-identified patent and that said Letters Patent is hereby corrected as shown below:

In Column 9, line 13, Example 4 thereof, please change "12-nylon" to -- 12,6-nylon --.

In Column 10, line 40, in Claim 1 of the patent, please change "pint" to -- point --.

Signed and Sealed this

Twenty-eighth Day of April, 1992

Attest:

HARRY F. MANBECK, JR.

*Attesting Officer*  *Commissioner of Patents and Trademarks*